United States Patent [19]

Kishi

[11] 4,373,701

[45] Feb. 15, 1983

[54] LIFTING APPARATUS

[76] Inventor: Mitsuhiro Kishi, 1320 Mizuhonocho, Ashikaga-shi, Tochigi-Pref., 326-03, Japan

[21] Appl. No.: 210,872

[22] Filed: Nov. 28, 1980

[51] Int. Cl.$^3$ .............................................. B60P 1/02

[52] U.S. Cl. .................................. 254/122; 254/9 C; 187/18

[58] Field of Search ............... 254/122, 8 R, 8 B, 8 C, 254/9 R, 9 B, 9 C, 124; 187/18; 182/69, 157, 158, 141

[56] References Cited

U.S. PATENT DOCUMENTS 3,168,284 2/1965 Fisher .................................. 254/8R 3,446,379 5/1969 Phillips ............................... 254/122

4,114,854 9/1978 Clark .................................. 254/122

FOREIGN PATENT DOCUMENTS 490681 2/1954 Italy ..................................... 254/9 B

*Primary Examiner*—Robert C. Watson

*Attorney, Agent, or Firm*—Martin A. Farber

[57] ABSTRACT

Lifting apparatus comprising a foundation, a platform, and a lifting mechanism of pantographic type disposed between the foundation and the platform. The lifting mechanism is constructed with a plurality of superimposed X-link units, each of the X-link units comprising a pair of link levers rotatably connected to each other at a central portion to form an X-link. A lever arm is rotatably provided between the central portion and an end of the one of link levers, and driving apparatus is provided on the one of link levers for rotating the lever arm. One end of the lever arm is engaged with the other link lever connected with the end of the link lever carrying the driving apparatus, whereby the rotation of the lever arm expands the lifting mechanism of pantographic type.

6 Claims, 5 Drawing Figures

LIFTING APPARATUS

BACKGROUND OF THE INVENTION

The present invention relates to lifting apparatus for elevating a platform suitable for working at elevated position.

For working, repairing, painting and other purposes at high places, lifting apparatus having a work platform for carrying workers and materials thereon has been used. Many of those conventionally used lifting apparatus have employed pantographic lifting mechanisms, each X-link unit of which is expansible by hydraulic cylinders to open the link levers directly.

In this type of conventional lifting mechanism, the hydraulic cylinder is fixed only to foundation, and the rod of cylinder is connected with a lowermost link lever of the mechanism of pantographic type. Because of such mechanism, the upper link levers start to expand later than the lower link levers, as a result, the whole pantograph cannot be smoothly actuated.

SUMMARY OF THE INVENTION

In order to overcome the above described drawbacks, the present invention provides a lifting apparatus in which the pantographic lifting mechanism expands vertically by actuating lever arms supportedly provided between two units of pantograph.

The invention will be more fully understood by way of example from the following description of elevating platforms in accordance therewith, reference being made to the accompanying drawings.

DETAILED DESCRIPTION OF THE PREFERRED EMBODIMENTS

Figure 1:
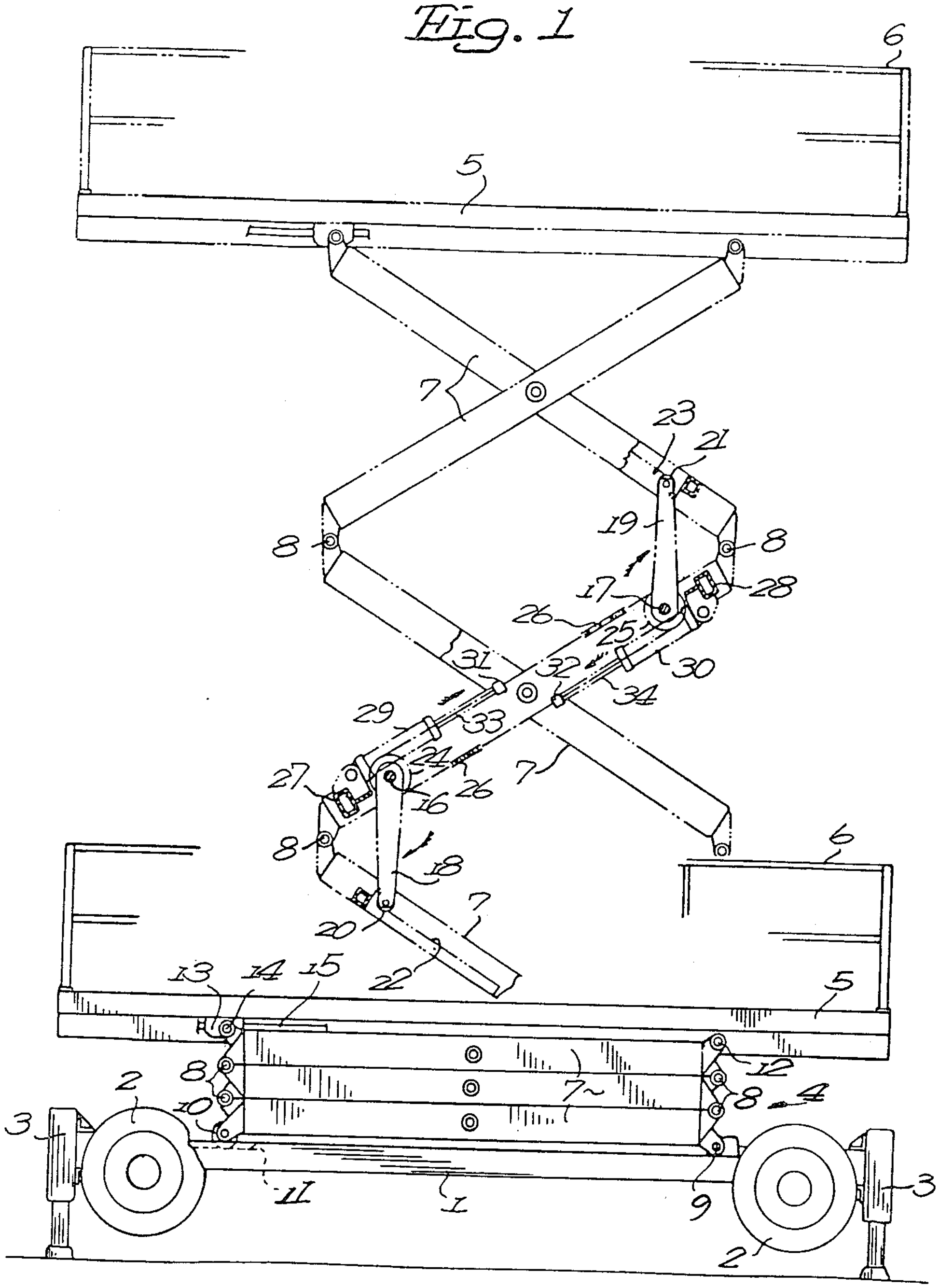
FIG. 1 is a side view showing a first embodiment of the lifting apparatus according to the present invention.
Figure 2:
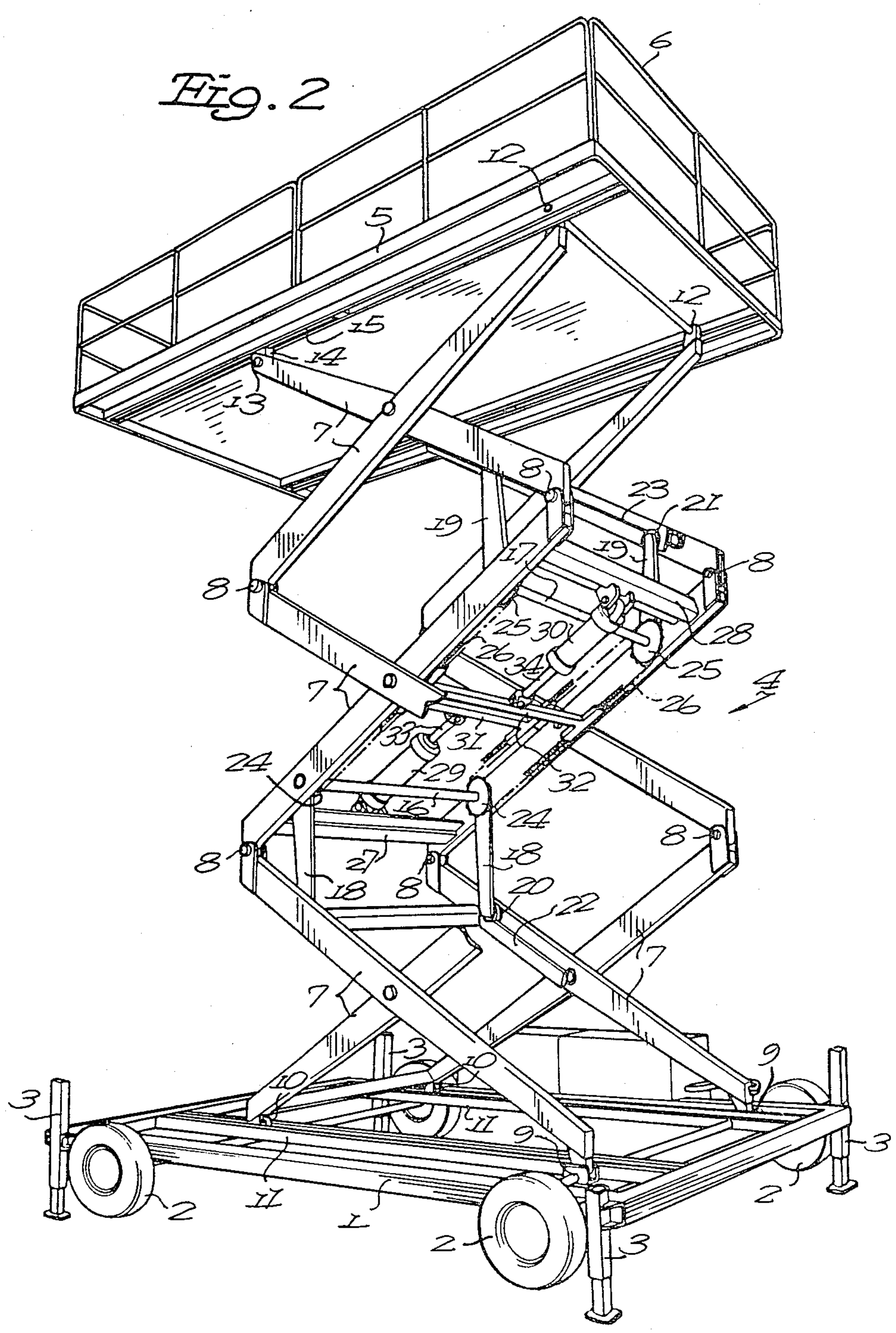
FIG. 2 is a perspective view showing the lifting apparatus of FIG. 1 the X-link unit of which is fully expanded.
Figure 3:
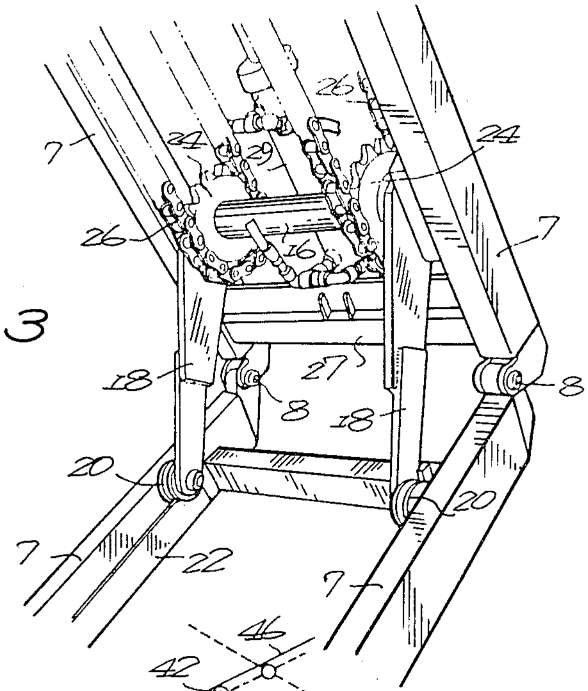
FIG. 3 is an enlarged perspective view showing the link lever portion.

Referring to FIGS. 1 and 2, numeral 1 designates a vehicle body, 2 are wheels supported at four corners of the body, 3 are extendible jacks secured also to the four corners of the body 1 (in this embodiment, the vehicle 1 is shown as a trailer). A lifting mechanism 4 is provided on the vehicle body 1 by pins and a platform 5 is connected by pins on the upper end of the lifting mechanism. A set of handrails 6 is provided circumferentially on the platform.

The lifting mechanism 4 of pantographic type comprises a plurality of connected X-link units. Each X-link unit comprises a pair of link levers 7 which are pivotally connected to each other to form an X-shape, a plurality of sets of X-link units are superimposed and adjacent units are rotatably connected together by pins 8. One end of the lowermost X-unit is connected by pins 9 to the body 1, and another end is supported by a roller 10 on the body 1, while one end of the uppermost X-unit is connected to the work platform 5 by pins 12, and another end is connected to a slider 13 by pins 14. The roller 10 is engaged with a guide rail 11 affixed to the body 1, while each slider 14 is engaged with a groove 15 provided on the under side of the platform 5.

Between the center and ends of the middle link lever 7, driving shafts 16, 17 are rotatably supported, to which are secured lever arms 18, 19 respectively. Each lever arm 18, 19 has a roller 20, 21, the end of which is engaged with respective fixed rails 22, 23 provided on the lever 7. Each driving shaft 16, 17 has respective sprocket wheels 24, 25 which engage a chain 26. Auxiliary connecting rods 27 and 28 are provided at the both ends of the pair of parallel levers 7 provided with the shafts 16 and 17. Connected at the center of these connecting rods 27, 28 are hydraulic cylinders 29, 30 which function as a driving device for the link units. Actuating rods 31 and 32 are fixedly bridged between the pair of chains 26. The actuating rods 31 and 32 have respective rod 33, 34 of cylinders 29, 30 connected to the center thereof.

The following is the description of the operation of the embodiment.

The work platform 5 is shown as in the lowermost position shown by solid lines in FIG. 1 and lever arms 18, 19 are positioned parallelly to the X-link units which are superimposed and folded flat under the work platform 5. In order to elevate the work platform 5, hydraulic cylinders 29, 30 are actuated to extend rods 33, 34 from the cylinders 29, 30. With the extension of rods 33, 34, actuating rods 31, 32 move to drive the chain 26, which go around sprocket wheels 24, 25, so that the sprocket wheels are rotated in the direction of the arrow shown in FIG. 1. The rotation of the sprocket wheels 24, 25 rotate driving shafts 16, 17 and lever arms 18, 19, so that the rollers 20, 21 borne at the ends of lever arms 18, 19 urge the rail 22, 23 to expand the pantograph. The rotation of the lever arms 18, 19 cause the opening angle of X-links to expand gradually with respect to each other, resulting in the upward stretch of the lifting mechanism 4 of pantographic type. Accordingly, the working platform 5 on the lifting mechanism 4 is elevated. The broken lines of FIG. 1 show the fully elevated condition of the platform 5, which is also shown in FIG. 2.

In order to lower the platform 5, the pressure in the hydraulic cylinder is reduced to retract the rods 33, 34 back into the cylinder 29, 30 and to rotate the chain 26 opposite to the direction of the arrow in FIG. 1.

Owing to the reverse rotation of the lever arms 18, 19, and also owing to the descent of the platform 5 by its own weight, the opening angle made by two adjacent link levers 7 of each unit becomes smaller.

Figure 4:
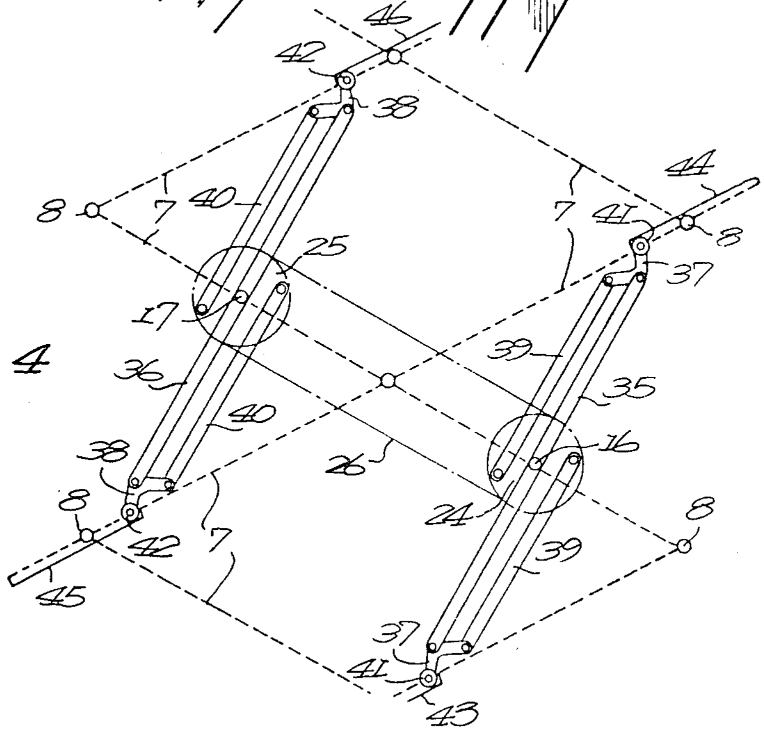
FIG. 4 is a schematic illustration of another embodiment of the invention.
Figure 5:
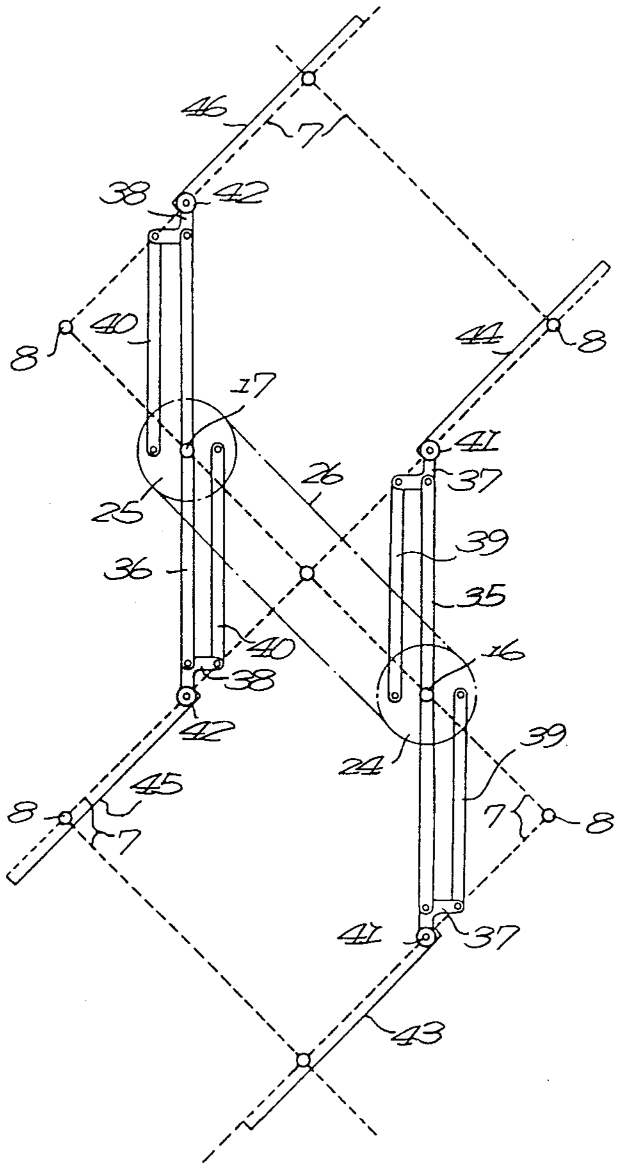
FIG. 5 is a side view showing fully expanded X-link unit of the second embodiment.

FIGS. 4 and 5 show a modification of the lifting apparatus, in which each of driving shafts 16, 17 is connected to the center of respective lever arm 35, 36. Each end of the lever arms 35, 36 has a V-shaped actuating member 37,38 connected rotatably at the corner of the member. An auxiliary rod 39 is provided to connect the link lever 7 and an end of actuating member 37. That is, a parallelogram is made by link lever 7, lever arm 35 (36), actuating member 37 (38) auxiliary rod 39 (40).

Carried at the other end of each actuating member 37 (38) is a roller 41 (42) which engages with rail 43 (44, 45, 46) provided on the lever 7.

In this embodiment, similar to the previous one, rotations of sprockets 24, 25, driving shafts 16, 17 rotate lever arms 35, 36, so that rollers 41, 42 carried on actuating members 37, 38 push the link levers 7 upward to elevate the platform 5. When the lever arm 35 (36) is rotated, the actuating member 37 (38) is rotated by auxiliary rod 39 (40) until the roller 41 (42) and lever arm 35 (36) are aligned. FIG. 5 shows the relation of the lever arms 35, 36 and the actuating members 37, 38 when the platform is fully elevated to a higher position. Thus, because rollers 41, 42 in this embodiment move along rails 43–46 for a longer distance than rollers 20, 21 of the previous embodiment shown in FIG. 1, at an identical rotary angle of lever arms 18, 19 and lever arms 35, 36, X-link units 7 of the mechanism shown in FIG. 4 stretch wider than the link units of the embodiment shown in FIG. 1, resulting in higher elevation of the platform 5.

According to the above-described construction of the present invention, which adapts lever arms to actuate the lifting mechanism of pantographic type and to expand each of the X-link units, the operation becomes smoother and the expansion of each X-link unit becomes uniform and steady.

What is claimed is:

1. A lifting apparatus comprising:

a foundation, a work platform, and a pantographic lifting mechanism operatively coupled between foundation and said work platform for elevating said work platform away from said foundation, said pantographic lifting mechanism including a plurality of pivotally coupled X-link units, each X-link unit having a pair of transversely spaced scissor linkages pivotally connected as at a midportion thereof, a first pair of lever arms having one pair of corresponding portions pivotally connected respectively to a first pair of transversely spaced scissor linkages of one of said X-link units and another pair of corresponding end portions of said first pair of lever arms being connected in rolling engagement at all times with a second pair of transversely spaced scissor linkages of a second of said X-link units, a second pair of lever arms having a first pair of corresponding end portions pivotally connected respectively to a first pair of transversely spaced scissor linkages of one of said X-link units and another pair of corresponding end portions in rolling engagement at all times with a third pair of transversely spaced scissor linkages of a third of said X-link units, said first and second pairs of said lever arms being disposed one on each side of the midportion of said one of said X-link units, and actuator means mounted on said first pair of transversely spaced scissor linkages and actuatable to move said first and second pairs of said lever arms in unison about said one ends thereof, whereby when said actuator means is actuated, said other ends will roll along said second and third transversely spaced scissor linkages to forcibly extend said X-link units with respect to each other.

2. The lifting apparatus according to claim 1, wherein said first and second pairs of said lever arms have rollers at said other ends thereof, said second and third transversely spaced scissor linkages having rails extending therealong, said rollers engaging said rails for rolling movement therealong.

3. The lifting apparatus according to claim 1, wherein said one of said X-link units includes at least one transverse connecting rod fixed to and extending between said first pair of transversely spaced scissor linkages, said actuator means being supported on said transverse connecting rod.

4. The lifting apparatus according to claim 3, wherein said actuator means comprises a pair of hydraulic cylinders, each of said cylinders being respectively mounted on one of said transverse connecting rods and having a respective piston rod, first and second pairs of transversely spaced sprocket wheels respectively joined to said first pair of corresponding end portions of said first and second pairs of said lever arms, a pair of transversely spaced endless chains respectively trained around said first and second pairs of transversely spaced sprocket wheels, and means for drivingly engaging said piston rods with said pair of transversely spaced endless chains whereby said sprocket wheels will rotate in response to actuation of said hydraulic cylinders.

5. The lifting apparatus according to claim 4, wherein said means for drivingly engaging said piston rods with said chains include a pair of actuating rods, each of said actuating rods being fixed to both of said transversely spaced endless chains, said piston rods being respectively connected to said actuating rods.

6. The lifting apparatus according to claim 1, further comprising a V-shaped actuating member pivotally mounted on each of said other ends of said first and second pair of lever arms and having a pair of end portions, a roller being mounted on each one of the respective corresponding end portions of each said V-shaped actuating member, said rollers respectively rollingly engaging each of said second and third pairs of transversely spaced scissor linkages, and respective auxiliary rods, each having one corresponding end connected to the other respective corresponding end portions of said V-shaped actuating member, said auxiliary rods having another corresponding end respectively connected to each of said first transversely spaced scissor linkages.

* * * * *